United States Patent Office 3,170,508
Patented Feb. 23, 1965

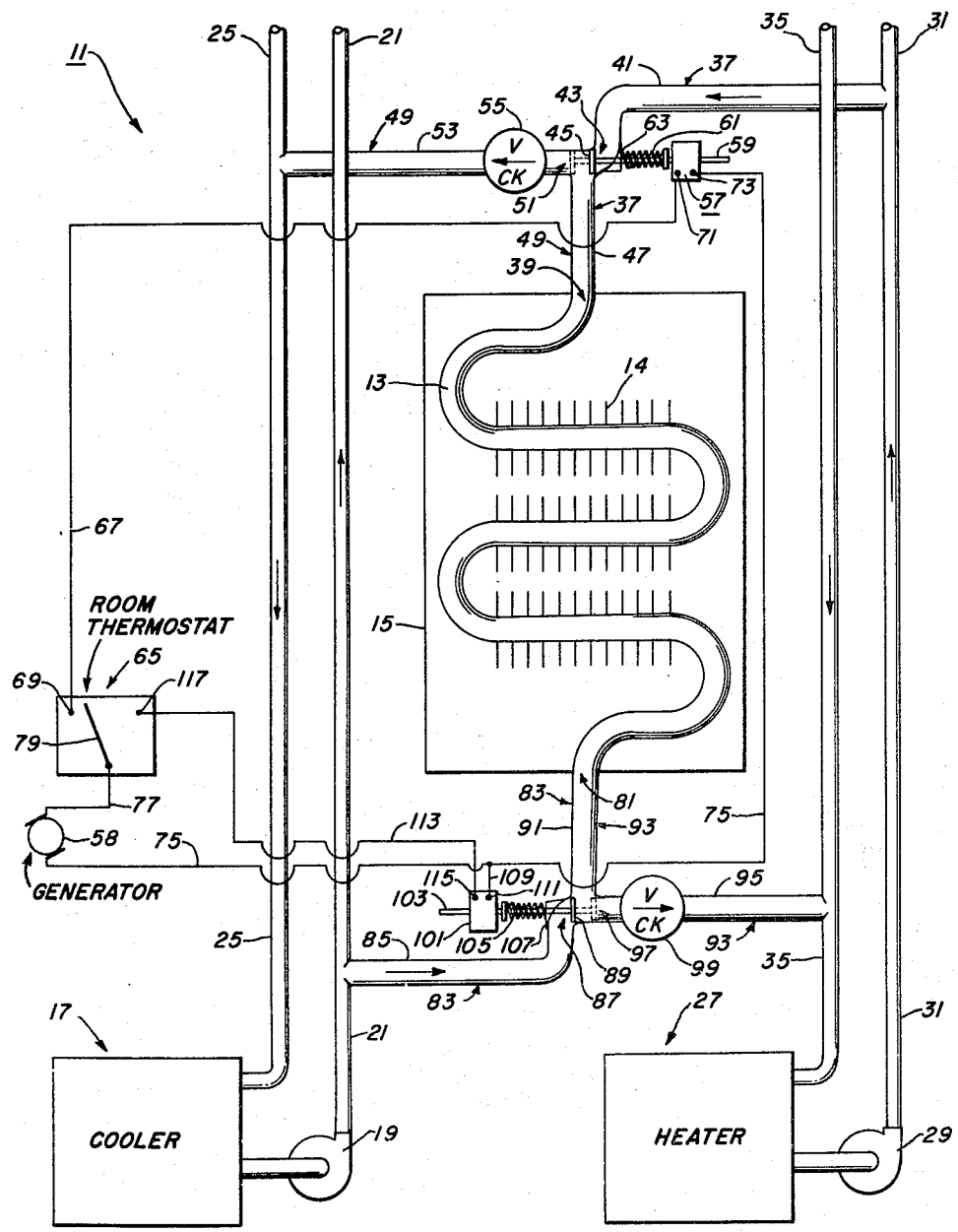

3,170,508
HEATING AND COOLING SYSTEM
Gilbert H. Avery, 4542 Aldersgate Road,
Memphis, Tenn.
Filed Dec. 18, 1962, Ser. No. 245,604
6 Claims. (Cl. 165—26)

This invention relates to improvements in space heating and cooling systems.

Heretofore, in heating and cooling systems that provided automatic changeover from heating to cooling and vice versa, there have been the following general types: (1) the so-called two coil type in which there were two separate coils, one for cooling and one for heating, with two entirely separate heating and cooling piping systems having two different valves involved in changing over from heating to cooling; (2) the so-called one coil type, in which the same coil was used for both heating and cooling, with four pipes being used (a return pipe and a delivery pipe for both the heating and cooling mediums) and with four valves being used. In this type the heating or cooling medium flowed through the coil in the same direction and through some of the same portions of the return and delivery pipes, and with the cooling or heating medium being selectively introduced into said portions; and (3) the so-called three pipe system in which there are two control valves, one in heating medium and one in cooling medium, and a single return pipe.

There are certain disadvantages inherent in the previous types of heating and cooling systems. For example, in the first of the above mentioned types of heating and cooling systems, the fact that two entirely separate heating and cooling coils are necessary adds greatly to the cost of the overall system. Also, in the second of the above mentioned types, the increased cost of having four valves is a disadvantage, as well as the problem of finding room for four valves in the limited space provided in the cabinets. In the third of the above mentioned types, there is a loss in efficiency due to the fact that a portion of the heating and cooling medium is mixed in the common return lines.

The present invention is directed towards overcoming the above mentioned and other disadvantages inherent in previous types of heating and cooling systems.

Thus, one of the important objects of the present invention is to provide a very efficient system and yet to provide one which is economical to build.

A further object is to provide a unique arrangement of the heating and cooling system in which a single coil and four pipes are used, with the heating medium being adapted to flow through the coil in the reverse direction from the cooling medium.

A further object is to provide in such an arrangement a unique flow control arrangement involving two three-way valves.

A further object is to provide, in such a system, check valves which prevent a transfer of the cooling medium to the heating medium and vice versa.

A furthe object is to provide such a system which is automatic in operation in its changeover from heating to cooling or vice versa and which is actuated by the temperature decreasing to a first pre-determined point or increasing to a second pre-determined point.

The means by which the foregoing and other objects of the present invention are accomplished and the manner of their accomplishment will be readily understood from the following specification upon reference to the accompanying drawing in which the figure is a somewhat diagrammatic view showing the heating and cooling system of the present invention.

Referring now to the drawing in which the various parts are indicated by numerals, the heating and cooling system 11 of the present invention includes at least one coil 13 preferably having fins 14, and which coil is preferably disposed in a cabinet or the like, indicated diagrammatically as at 15, which is located in the space where heating and cooling is desired. It is contemplated, of course, that other coils in other locations where heating and cooling are desired may be used, but the showing of the one coil in the drawing will illustrate the principle of subject invention.

In the drawing, the source of cooling medium is shown diagrammatically as at 17 and is any suitable source, such as water cooled by refrigeration by well-known means, and is provided with the usual pump 19 which pumps the cooling medium through the cooling medium delivery conduit 21. The cooling medium passes through the coil 13, as will be better understood in the description to follow, and thence returns to cooling medium source 17 through the cooling medium return conduit 25.

In the drawing, the source of heating medium is indicated diagrammatically as at 27 and is any suitable means, such as a boiler or the like, and is provided with a pump 29 to pump the heating medium through the heating medium delivery conduit 31. The heating medium goes through coil 13, as will be better understood in the description to follow, and thence returns to the source of heating medium through the heating medium return conduit 35.

Thus, the heating and cooling system 11 is a four pipe system, that is, it has four pipes or conduits, namely, the cooling medium delivery conduit 21 and return conduit 25, and the heating medium delivery conduit 31 and return conduit 35. In the drawing, the conduits 21, 25, 31 and 35 are shown broken to indicate that the pipes or conduits may be lengthened to extend to other locations, as, for example, to the next room in a building where another coil 13 may be installed in the same manner as the following described installation of the coil 13 which is shown in the drawing.

A first inlet passage 37 leads from heating medium delivery conduit 31 to a first end 39 of coil 13. First inlet passage 37 preferably includes a passage portion 41 which leads from heating medium delivery conduit 31 to a port 43 that normally is closed by a valve 45, and the first inlet passage also includes a passage portion 47 that leads from port 43 into coil 13 at first end 39.

A first outlet passage 49 leads from coil 13 at first end 39 to cooling medium return conduit 25. First outlet passage 49 preferably includes passage portion 47 that is also common to first inlet passage 37, as above described, and that leads from the coil 13 to a port 51 that is normally open, but closable by valve 45 when the valve is actuated, as will be described later in the specification. Additionally, first outlet passage 49 includes a passage portion 53 that leads from port 51 to cooling medium return conduit 25. A first check valve 55 of usual construction is interposed in passage portion 53 for blocking flow therethrough from the cooling medium return conduit 25 and for allowing flow therethrough towards the cooling medium return conduit. It will be observed that valve 45 controls the flow through first inlet passage 37 and first outlet passage 49, and the valve is of suitable construction, as, for example, the two-position three-way type shown, or of the proportioning sequencing three-way type of known construction. In the drawing, valve 45 is shown as being of the solenoid actuated type and is provided with a solenoid 57, a valve stem 59, and a compression spring 61 that bears against a fixed seat 63 adjacent one end thereof and is attached adjacent the opposite end thereof to valve stem 59, so that the spring normally urges valve 45 to the right to block port 43 and open port 51 when the solenoid is de-energized. When solenoid 57 is energized by the means hereinafter described, valve 45 will be moved to the dotted line position to block port 51 and open port 43.

A so-called two-stage thermostat of well-known construction is provided and is indicated somewhat diagrammatically as at 65, and the thermostat is wired as follows: A lead 67 extends from terminal 69 on thermostat 65 to one terminal 71 of solenoid 57. The other terminal 73 of solenoid 57 is connected by a lead 75 to a suitable source of power, such as A.C. generator 58. Another lead 77 extends from the source of power to the temperature responsive arm 79 on thermostat 65. The thermostat is arranged in the usual manner so that when the temperature decreases to a first pre-determined point, as, for example, 70 degrees, the arm 79 will contact terminal 69 and complete the circuit through solenoid 57, which causes valve 45 to open port 43 and block port 51.

An arrangement somewhat similar to the above described arrangement at the first end 39 is provided adjacent the opposite or second end 81 of coil 13. Thus, a second inlet passage 83 leads from cooling medium delivery conduit 21 to coil 13 at second end 81. Second inlet passage 83 includes a passage portion 85 that leads from cooling medium delivery conduit 21 to a port 87 that is normally blocked by a valve 89. Additionally, second inlet passage 83 includes a passage portion 91 that leads from port 87 to coil 13 at second end 81. A second outlet passage 93 leads from coil 13 at second end 81 to heating medium return conduit 35. Second outlet passage 93 includes passage portion 91, common to second inlet passage 83, and a passage portion 95 leading from port 97 to heating medium return conduit 35. A check valve 99 is provided in passage portion 95 to permit flow through the passage portion towards heating medium return conduit 35 but to block flow in the opposite direction. The parts related to valve 89 are similar to those related to valve 45 and, thus, include a solenoid 101, a valve stem 103, a compression spring 105, and a fixed seat 107, which parts respectively correspond with solenoid 57, valve stem 59, compression spring 61, and fixed seat 63. Normally, valve 89 blocks the flow through second inlet passage 83 and permits flow through second outlet passage 93, and when the valve is actuated by energization of solenoid 101, as will be hereinafter described, the valve moves to the dotted line position shown in the drawing to permit flow through second inlet passage 83 and block flow through second outlet passage 93. A lead 109 connects terminal 111 of solenoid 101 to lead 75, and a lead 113 connects the other terminal 115 of solenoid 101 to a terminal 117 on thermostat 65. Thermostat 65 is arranged so that when the temperature reaches a second pre-determined point, as, for example 73 degrees, which is above the first pre-determined point heretofore mentioned, arm 79 will contact terminal 117 and complete the circuit to solenoid 101 and move valve 89 to the dotted line position.

It will be understood that the valve operators for valves 45 and 89, instead of being of the solenoid type heretofore described, may be of the motor operated or air operated pneumatic type without departing from the spirit and scope of the present invention.

In describing the operation of the device, it is first assumed that the temperature is below said first pre-determined point, in which case the circuit is completed to solenoid 57, and valve 45 is in the dotted line position. Thus, the heating medium will flow from the heating medium delivery conduit 31 through first inlet passage 37 and through coil 13 from the first end 39 thereof towards the second end 81 thereof and out through second outlet passage 93 into heating medium return conduit 35. Then, when the temperature increases above said first pre-determined point, the circuit to solenoid 57 will be broken, and valve 45 will return to its normal position, shown in solid lines, in which case the flow of heating medium will be cut off, and there will be no flow through coil 13. Then, when the temperature increases to said second pre-determined point, the circuit to solenoid 101 will be completed, and valve 89 will move into the dotted line position, in which case the cooling medium will flow from cooling medium delivery conduit 21 through second inlet passage 83, through coil 13 from the second end 81 thereof towards the first end 39 thereof, and through first outlet passage 49 to cooling medium return conduit 25. The above sequence of operation will be reversed on a decrease in temperature.

From the foregoing, it will be noted that when the cooling medium flows through coil 13, it flows in the opposite direction through the coil from the direction of flow of the heating medium. This is a very important feature of the present invention since by having the flow in opposite directions and by using four pipes with the two valves at the opposite ends of the coil, a very efficient and economical arrangement is provided. It should be noted that with this particular arrangement there is very little mixing of the cooling and heating medium, which provides a highly economical arrangement. In addition, it will be noted that the arrangement is also of such a nature that it is economical to build since only two valves are used and one coil. Furthermore, the arrangement of the present invention is automatic in operation.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a heating and cooling system, a source of heating medium, a heating medium delivery conduit and a heating medium return conduit respectively leading from and leading to said source of heating medium, a source of cooling medium, a cooling medium delivery conduit and a cooling medium return conduit respectively leading from and leading to said source of cooling medium, a coil, means including passage means between said coil and said delivery and return conduits and including a pair of three-way valve means in said passage means respectively adjacent opposite ends of said coil for selectively directing the flow of said heating medium from said heating medium delivery conduit through said coil in one direction and into said heating medium return conduit and directing the flow of said cooling medium from said cooling medium delivery conduit through said coil in the opposite direction and into said cooling medium return conduit, a pair of check valve means in said passage means respectively between said pair of three-way valve means and said return conduits for preventing flow from said conduits toward said coil and permitting flow in the opposite direction.

2. In a heating and cooling system, a source of heating medium, a heating medium delivery conduit and a heating medium return conduit respectively leading from and leading to said source of heating medium, a source of cooling medium, a cooling medium delivery conduit and a cooling medium return conduit respectively leading from and leading to said source of cooling medium, a coil having a first end and an opposite second end, first inlet passage means leading from said heating medium delivery conduit to said first end, first outlet passage means leading from said first end to said cooling medium return conduit, heating medium control means including a three-way valve means for controlling the flow through said first inlet passage means and said first outlet passage means to and from said coil at said first end, first check valve means in said first outlet passage means between said three-way valve means and said cooling medium return conduit for preventing flow from said cooling medium return conduit toward said coil and permitting flow in the opposite direction, said heating control means being effective normally to close off said first inlet passage means and open said first outlet passage means, second inlet passage means leading from said cooling medium delivery conduit to said second end, second outlet passage means leading from said second end to said heating medium return conduit, cooling medium control means including an additional three-way valve means for controlling the flow through said second inlet passage means and said second outlet passage means to and from said coil at said second end, second check valve means in said second outlet passage means between said additional three-way valve means and said heating medium return conduit for preventing flow from said heating medium return conduit toward said coil and permitting flow in the opposite direction, said cooling medium control means being effective normally to close off said second inlet passage means and open said second outlet passage means, said heating medium control means being operable to open said first inlet passage means and close off said first outlet passage means whereby the heating medium is allowed to flow through said coil from said first end towards said second end, and said cooling medium control means being operable to open said second inlet passage means and close off said second outlet passage means whereby the cooling medium is allowed to flow through said coil from said second end towards said first end.

3. In a heating and cooling system, a source of heating medium, a heating medium delivery conduit and a heating medium return conduit respectively leading from and leading to said source of heating medium, a source of cooling medium, a cooling medium delivery conduit and a cooling medium return conduit respectively leading from and leading to said source of cooling medium, a coil having a first end and an opposite second end, first inlet passage means leading from said heating medium delivery conduit to said first end, first outlet passage means leading from said first end to said cooling medium return conduit, thermostat means responsive to a temperature decrease to a first pre-determined point and to a temperature increase to a second pre-determined point above said first pre-determined point, heating medium control means including a three-way valve means responsive to said thermostat means for controlling the flow through said first inlet passage means and said first outlet passage means to and from said coil at said first end, first check valve means in said first outlet passage means between said three-way valve means and said cooling medium return conduit for preventing flow from said cooling medium return conduit toward said coil and permitting flow in the opposite direction, said heating control means being effective normally to close off said first inlet passage means and open said first outlet passage means when the temperature is above said first pre-determined point, second inlet passage means leading from said cooling medium delivery conduit to said second end, second outlet passage means leading from said second end to said heating medium return conduit, cooling medium control means including an additional three-way valve means responsive to said thermostat means for controlling the flow through said second inlet passage means and said second outlet passage means to and from said coil at said second end, second check valve means in said second outlet passage means between said additional three-way valve means and said heating medium return conduit for preventing flow from said heating medium return conduit toward said coil and permitting flow in the opposite direction, said cooling medium control means being effective normally to close off said second inlet passage means and open said second outlet passage means when the temperature is below said second pre-determined point, when the temperature decreases to said first pre-determined point said heating medium control means being responsive to said thermostat means to open said first inlet passage means and close off said first outlet passage means whereby the heating medium is allowed to flow through said coil from said first end towards said second end, and when the temperature increases to said second pre-determined point said cooling medium control means being responsive to said thermostat means to open said second inlet passage means and close off said second outlet passage means whereby the cooling medium is allowed to flow through said coil from said second end towards said first end.

4. In a heating and cooling system, a source of heating medium, a heating medium delivery conduit and a heating medium return conduit respectively leading from and leading to said source of heating medium, a source of cooling medium, a cooling medium delivery conduit and a cooling medium return conduit respectively leading from and leading to said source of cooling medium, a coil having a first end and an opposite second end, first inlet passage means leading from said heating medium delivery conduit to said first end, first outlet passage means leading from said first end to said cooling medium return conduit, first check valve means interposed in said first outlet passage means for blocking flow therethrough from said cooling medium return conduit and allowing flow towards said cooling medium return conduit, thermostat means responsive to a temperature decrease to a first pre-determined point and to a temperature increase to a second pre-determined point above said first pre-determined point, heating medium control means including a three-way valve means responsive to said thermostat means for controlling the flow through said first inlet passage means and said first outlet passage means to and from said coil at said first end, said heating control means being effective normally to close off said first inlet passage means and open said first outlet passage means when the temperature is above said first predetermined point, second inlet passage means leading from said cooling medium delivery conduit to said second end, second outlet passage means leading from said second end to said heating medium return conduit, second check valve means interposed in said second outlet passage means blocking flow therethrough from said heating medium return conduit and allowing flow towards said heating medium return conduit, cooling medium control means including an additional three-way valve means responsive to said thermostat means for controlling the flow through said second inlet passage means and said second outlet passage means to and from said coil at said second end, said cooling medium control means being effective normally to close off said second inlet passage means and open said second outlet passage means when the temperature is below said second predetermined point, when the temperature decreases to said first pre-determined point said heating medium control means being responsive to said thermostat means to open said first inlet passage means and close off said first outlet passage means whereby the heating medium is allowed to flow through said coil from said first end towards said second end, and when the temperature increases to said second pre-determined point said cooling medium control means being responsive to said thermostat means to open said second inlet passage means and close off said second outlet passage means whereby the cooling medium is allowed to flow through said coil from said second end towards said first end.

5. In a heating and cooling system, a source of heating medium, a heating medium delivery conduit and a heating medium return conduit respectively leading from and leading to a source of heating medium, a source of cooling medium, a cooling medium delivery conduit and a cooling medium return conduit respectively leading from and leading to said source of cooling medium, a coil having a first end and an opposite second end, first inlet passage means leading from said heating medium delivery conduit to said first end, first outlet passage means leading from said first end to said cooling medium return conduit, thermostat means responsive to a temperature decrease to a first predetermined point and to a temperature increase to a second pre-determined point above said first pre-determined point, said first inlet passage means and said first outlet passage means intersecting and including a common passage portion leading from the intersection thereof to said first end of said coil, heating medium control means including a two-position three-way valve means at the intersection of said first inlet passage means and said first outlet passage means and responsive to said thermostat means for controlling the flow through said first inlet passage means and said first outlet passage means to and from said coil at said first end, first check valve means in said first outlet passage means between said three-way valve means and said cooling medium return conduit for preventing flow from said cooling medium return conduit toward said coil and permitting flow in the opposite direction, said heating medium control means being effective normally to close off said first inlet passage means and open said first outlet passage means when the temperature is above said first predetermined point, second inlet passage means leading from said cooling medium delivery conduit to said second end, second outlet passage means leading from said second end to said heating medium return conduit, said second inlet passage means and said second outlet passage means intersecting and including a common passage means leading from the intersection thereof to said second end of said coil, cooling medium control means including an additional two-position three-way valve means at the intersection of said second inlet passage means and said second outlet passage means and responsive to said thermostat means for controlling the flow through said second inlet passage means and said second outlet passage means to and from said coil at said second end, second check valve means in said second outlet passage means between said additional three-way valve means and said heating medium return conduit for preventing flow from said heating medium return conduit toward said coil and permitting flow in the opposite direction, said cooling medium control means being effective normally to close off said second inlet passage means and open second outlet passage means when the temperature is below said second pre-determined point, when the temperature decreases to said first pre-determined point said heating medium control means being responsive to said thermostat means to open said first inlet passage means and close off said first outlet passage means whereby the heating medium is allowed to flow through said coil from said first end towards said second end, and when the temperature increases to said second pre-determined point said cooling medium control means being responsive to said thermostat means to open said second inlet passage means and close off said second outlet passage means whereby the cooling medium is allowed to flow through said coil from said second end towards said first end.

6. In a heating and cooling system, a source of heating medium, a heating medium delivery conduit and a heating medium return conduit respectively leading from and leading to said source of heating medium, a source of cooling medium, a cooling medium delivery conduit and a cooling medium return conduit respectively leading from and leading to said source of cooling medium, a coil having a first end and an opposite second end, first inlet passage means leading from said heating medium delivery conduit to said first end, first outlet passage means leading from said first end to said cooling medium return conduit, said first inlet passage means and said first outlet passage means intersecting and including a common passage portion leading from the intersection thereof to said first end of said coil, heating medium control means including a two-position three-way valve means at the intersection of said first inlet passage means and said first outlet passage means for controlling the flow through said first inlet passage means and said first outlet passage means to and from said coil at said first end, first check valve means in said first outlet passage means between said three-way valve means and said cooling medium return conduit for preventing flow from said cooling medium return conduit toward said coil and permitting flow in the opposite direction, said heating medium control means being effective normally to close off said first inlet passage means and open said first outlet passage means, second inlet passage means leading from said cooling medium delivery conduit to said second end, second outlet passage means leading from said second end to said heating medium return conduit, said second inlet passage means and said second outlet passage means intersecting and including a common passage portion leading from the intersection thereof to said second end of said coil, cooling medium control means including an additional two-position three-way valve means at the intersection of said second inlet passage means and said second outlet passage means for controlling the flow through said second inlet passage means and said second outlet passage means to and from said coil at said second end, second check valve means in said second outlet passage means between said additional three-way valve means and said heating medium return conduit for preventing flow from said heating medium return conduit toward said coil and permitting flow in the opposite direction, said cooling medium control means being effective normally to close off said second inlet passage means and open said second outlet passage means, said heating medium control means being operable to open said first inlet passage means and close off said first outlet passage means whereby the heating medium is allowed to flow through said coil from said first end toward said second end, and said cooling medium control means being operable to open said second inlet passage means and close off said second outlet passage means whereby the cooling medium is allowed to flow through said coil from said second end toward said first end.

References Cited by the Examiner
UNITED STATES PATENTS 2,535,892  12/50  Branson _____ 236—1
3,069,867  12/62  Ringquist.

CHARLES SUKALO, *Primary Examiner.*
JAMES W. WESTHAVER, *Examiner.*